June 4, 1963  R. L. GOLD  3,092,392
LIQUID FUEL BURNING APPARATUS, A SEAL BETWEEN A STATIONARY
CYLINDRICAL CASING AND A SUBSTANTIALLY
CYLINDRICAL HOLLOW MEMBER
Filed Nov. 14, 1960  3 Sheets-Sheet 1

Inventor
R. L. Gold

United States Patent Office 3,092,392
Patented June 4, 1963

3,092,392
LIQUID FUEL BURNING APPARATUS, A SEAL BETWEEN A STATIONARY CYLINDRICAL CASING AND A SUBSTANTIALLY CYLINDRICAL HOLLOW MEMBER
Richard Lucius Gold, Kings Heath, Birmingham, England, assignor to Joseph Lucas (Industries) Limited, Birmingham, England
Filed Nov. 14, 1960, Ser. No. 69,017
1 Claim. (Cl. 277—5)

This invention relates to liquid fuel burning apparatus of the kind comprising a stationary cylindrical casing having an annular peripheral air inlet, a burner within the casing, and a shutter in the form of a substantially cylindrical hollow member which is movable axially relative to the casing to provide and close the air inlet.

The object of the present invention is to provide a convenient means for effecting a seal between one end of the shutter and the casing.

According to the invention, the means for effecting the seal comprises in combination with the cylindrical casing and the substantially cylindrical hollow member, a sealing ring coaxial with, and in contact with a peripheral surface of, said casing, an intermediate ring situated coaxially between, and axially spaced from, said sealing ring and one end of said hollow member, means whereby said intermediate ring is pivotally connected to said hollow member on an axis in diametrical relationship to said hollow member, and means whereby said sealing ring is pivotally connected to said intermediate ring on another axis which is also in diametrical relationship to said hollow member, but which is at right angles to the pivot axis of said intermediate ring.

Figure 1:
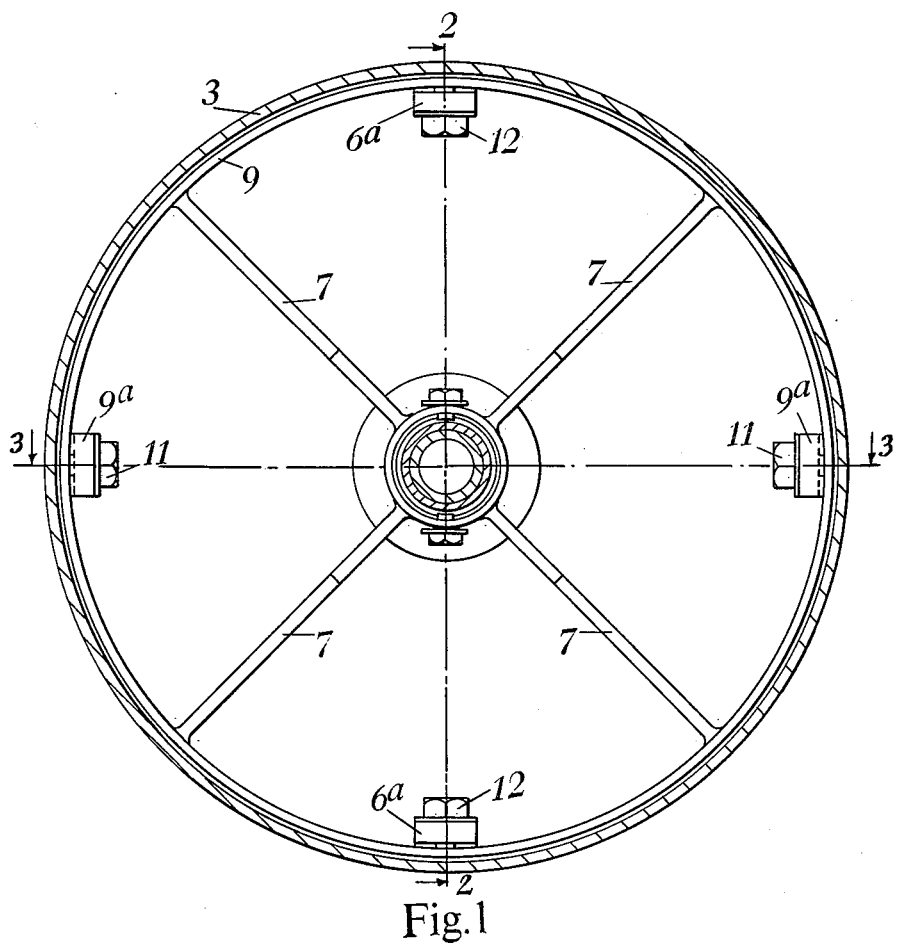
Figure 2:
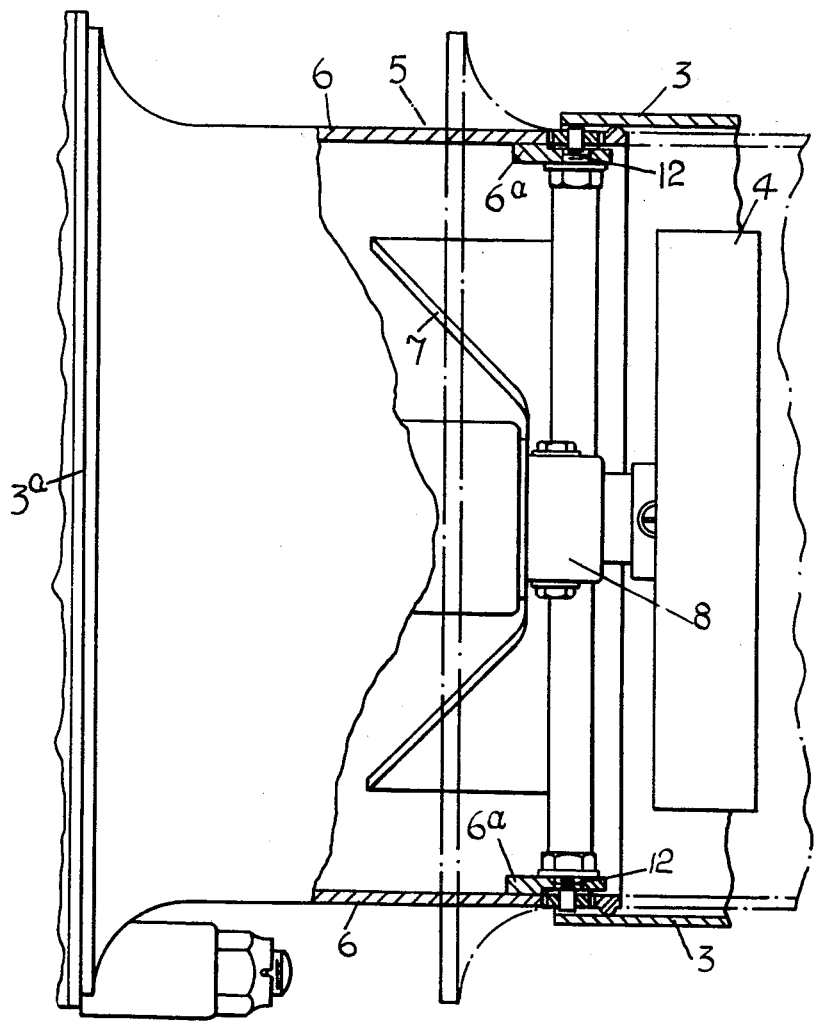
Figure 3:
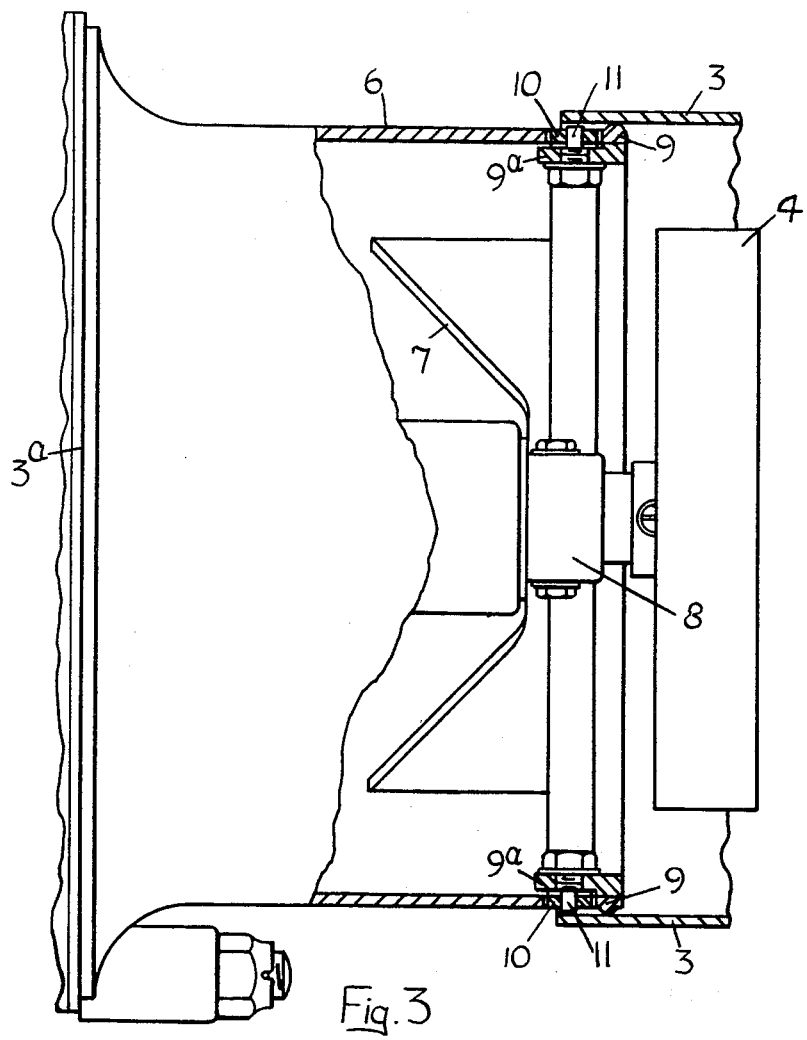

In the accompanying drawings FIGURE 1 is a cross-section of one example of the invention, FIGURE 2 is a section on the line 2—2 of FIGURE 1, and FIGURE 3 is a section on the line 3—3 of FIGURE 1.

The apparatus may be as described in the specification of our co-pending application Serial No. 69,015 of even date, and now abandoned, and includes a cylindrical casing 3 containing a burner surrounded by a swirler 4, and having between one of its ends and the stationary plate-like part 3a an annular peripheral inlet hereinafter described. Supported coaxially with, and extending from the last mentioned end of, the casing 3 is a substantially cylindrical shutter 6 which is axially movable in opposite directions between the positions shown in full and chain-dotted lines in FIGURE 2 to provide and close the annular peripheral air inlet 5. For moving the shutter axially it is connected by a spider 7 to an axially movable tube 8, at the centre of the casing so that axial movement of the tube is accompanied by axial movement of the shutter.

In order to make an effective seal between the interior of the casing 3, and that end of the shutter 6 which is slidable therein, there is provided at this end of the shutter a self-aligning sealing ring 9. The sealing ring has a convex external periphery which is adapted to make contact with the internal periphery of the casing. Situated coaxially between the sealing ring 9 and the adjacent end of the shutter 6 is an intermediate ring 10 which has internal and external diameters equal to those of the shutter, and which is axially spaced from the sealing ring and the adjacent end of the shutter as shown in FIGURE 2 so as to be capable of limited movement relative thereto. Also from the inner periphery of the sealing ring 9 a pair of diametrically opposite lugs 9a extend axially. These lugs 9a are located within, and are pivotally connected to the intermediate ring 10 by means of a pair of coaxial and radial pins 11 which are in screw-thread engagement with holes in the lugs and extend into holes formed in the intermediate ring 10.

The intermediate ring 10 is also pivotally connected to the shutter 6 at two positions angularly spaced 90° from the pivotal connections between the intermediate ring and the sealing ring. For this purpose from the adjacent end of the shutter a pair of diametrically opposite lugs 6a extend into the intermediate ring, and each lug 6a incorporates a screw-threaded hole accommodating a screw threaded pin 12 extending radially into a hole formed in the intermediate ring.

By virtue of the fact that the sealing ring 9 is connected to the adjacent end of the shutter 6 through the medium of the lugs 9a, the pins 11, the intermediate ring 10, the lugs 6a, and the pins 12, the sealing ring is capable of a limited universal movement relative to the shutter so that the sealing ring can maintain an effective seal with the internal periphery of the casing irrespective of slight misalignments of the shutter relative to the casing 3.

It will be understood that a small amount of air can flow through the spaces between the intermediate ring 10, the sealing ring 9, and the adjacent end of the shutter 6, irrespective of the position of the shutter, but the sealing ring prevents additional air flow between it and the casing even if there is a slight misalignment of the shutter relative to the casing.

Having thus described my invention, what I claim as new and desire to secure by Letters Patent is:

For use in a liquid fuel burning apparatus of the kind specified, means for effecting a seal between a stationary cylindrical casing and a substantially cylindrical hollow member supported coaxially with, and movable axially relative to, the casing, comprising in combination with the cylindrical casing and the substantially cylindrical hollow member, a sealing ring coaxial with, and in contact with a peripheral surface of, said casing, an intermediate ring situated coaxially between, and axially spaced from, said sealing ring and one end of said hollow member, means whereby said intermediate ring is pivotally connected to said hollow member on an axis in diametrical relationship to said hollow member, and means whereby said sealing ring is pivotally connected to said intermediate ring on another axis which is also in diametrical relationship to said hollow member, but which is at right angles to the pivot axis of said intermediate ring.

References Cited in the file of this patent
UNITED STATES PATENTS

| 1,311,834 | Mueller | July 29, 1919 |
| 1,950,980 | Frisch | Mar. 13, 1934 |
| 1,966,524 | Schenck | July 17, 1934 |
| 2,497,441 | Detweiler | Feb. 14, 1950 |